United States Patent [19]

Bryant

[11] 3,800,253

[45] Mar. 26, 1974

[54] DIGITAL CONTROLLER FOR A BAUM FOLDING MACHINE

[75] Inventor: Wayne H. Bryant, Hampton, Va.

[73] Assignee: The United States of America as represented by the Administrator of the National Aeronautics and Space Administration, Washington, D.C.

[22] Filed: Sept. 1, 1972

[21] Appl. No.: 285,705

[52] U.S. Cl. .......... 235/151, 235/92 SB, 235/92 PE
[51] Int. Cl. .......................... G06f 15/46, G06m 9/00
[58] Field of Search ............. 235/151, 151.1, 92 SB, 235/92 PE, 92 CE, 98 R; 355/14

[56] References Cited

UNITED STATES PATENTS

| | | | |
|---|---|---|---|
| 3,710,936 | 1/1973 | Mizunuma | 235/92 SB |
| 3,652,834 | 3/1972 | Shigemori et al. | 235/92 SB |
| 3,652,833 | 3/1972 | Shigemori et al. | 235/92 SB |
| 3,609,309 | 9/1971 | Arp et al. | 235/92 PE |
| 3,604,903 | 9/1971 | Hill | 235/92 PE |
| 3,588,472 | 6/1971 | Glaster et al. | 235/92 SB |

*Primary Examiner*—Felix D. Gruber
*Attorney, Agent, or Firm*—Howard J. Osborn; William H. King; John R. Manning

[57] ABSTRACT

A digital controller for controlling the operation of a folding machine enables automatic folding of a desired number of sheets responsive to entry of that number into a selector. The controller preferably includes three decade counter stages for corresponding rows of units, tens and hundreds push buttons, each stage including a decimal-to-BCD encoder for converting the selected decimal number into BCD, a buffer register for storing the output of the encoder and a digital or binary counter. The BCD representation of the selected count for each digit is loaded into the respective decade down counters. Pulses generated by a sensor and associated circuitry are used to decrease the count in the decade counters. When the content of the decade counter reaches either 0 or 1, a solenoid control valve is actuated which interrupts operation of the machine. A repeat switch, when actuated, prevents clearing of the buffer registers so that multiple groups of the same number of sheets can be folded without reentering the number into the selector.

12 Claims, 9 Drawing Figures

DIGITAL CONTROLLER FOR A BAUM FOLDING MACHINE

ORIGIN OF THE INVENTION

The invention described herein was made by an employee of the United States Government and may be manufactured and used by or for the Government for governmental purposes without the payment of any royalties thereon or therefor.

FIELD OF THE INVENTION

The present invention relates to a digital control system for a folding machine.

BACKGROUND OF THE INVENTION

A fundamental step in the making of a printed document is the folding of the printed sheets which form the document. Although folding machines are available for this purpose, it may be observed that, particularly where a large number of sheets are to be folded, the problem of controlling the folding process and counting the folded sheets to ensure that the correct number is produced is a task which is at the very least highly time consuming. Hence, a need has existed prior to the present invention for a controller or control system for automatically controlling the operation of a folding machine which is at the same time reliable, efficient and relatively inexpensive to manufacture and maintain.

SUMMARY OF THE INVENTION

According to the present invention, a controller for a folding machine is provided which exhibits the qualities set forth above, viz., reliability, efficiency and relatively low cost. The controller of the invention, while enabling the number of sheets to be folded to be entered in decimal form, is essentially a binary system and hence provides the numerous advantages of such a system.

In accordance with a presently preferred embodiment thereof, the controller of the invention includes an operator-controlled selector for producing a decimal number output representing the desired number of sheets of pages to be folded as selected by the operator, and an encoder which converts the selector output into a corresponding number according to a selected digital code, 8421 binary code decimal (BCD) being used in a preferred embodiment. A buffer register stores the coded output and continuously presents the stored output to a counter. Before starting the folding process, the contents of the buffer register are loaded into the decade counters. A sensor detects the passage of the sheets to be folded to the folding machine and produces an output signal in accordance with the number of sheets passing to the machine. The decade down counter receives this signal and decreases its contents accordingly. When the decade counter counts down to a predetermined number, either 0, or 1, in a specific embodiment, an output signal is produced which terminates the operation of the machine.

The controller perferably includes three decade stages for corresponding rows of units, tens and hundreds push-button switches in the selector, each including an encoder, buffer register and counter. Transfer circuits control transfer of the contents of the registers to the counters and a repeat switch, when actuated, prevents clearing of the buffer registers so that multiple groups of the same number of sheets can be folded without re-enetering the number into the selector.

Starting and stopping of the machine is controlled by a solenoid controlled valve operated by an A.C. switch, stopping of the machine being normally effected by an output signal from counter as mentioned above. "Reset", "pause" and "start" switches described below also control machine operation.

The invention includes a number of other features and provides a number of other advantages which can, in many instances, be best appreciated by a more detailed consideration of the overall invention. These features and advantages are set forth in or will be apparent from the detailed description of a preferred embodiment found hereinbelow and hence, rather than prolong this introductory discussion, this description will now be considered.

DESCRIPTION OF THE PREFERRED EMBODIMENT

Figure 1:
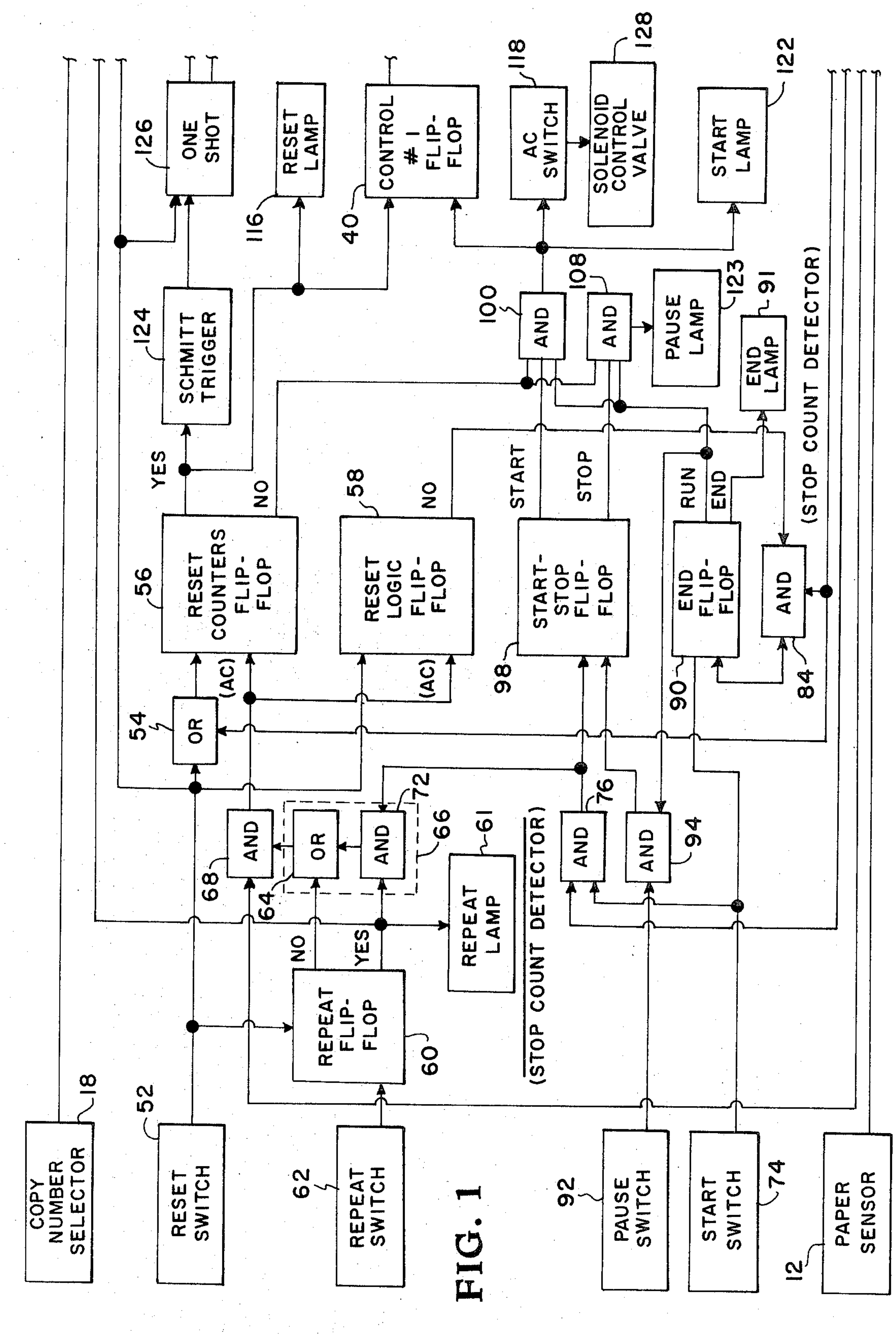
FIG. 1 and 1*a* taken together are a block circuit diagram of a presently preferred embodiment of the folding machine controller of the invention.
Figure 1A:
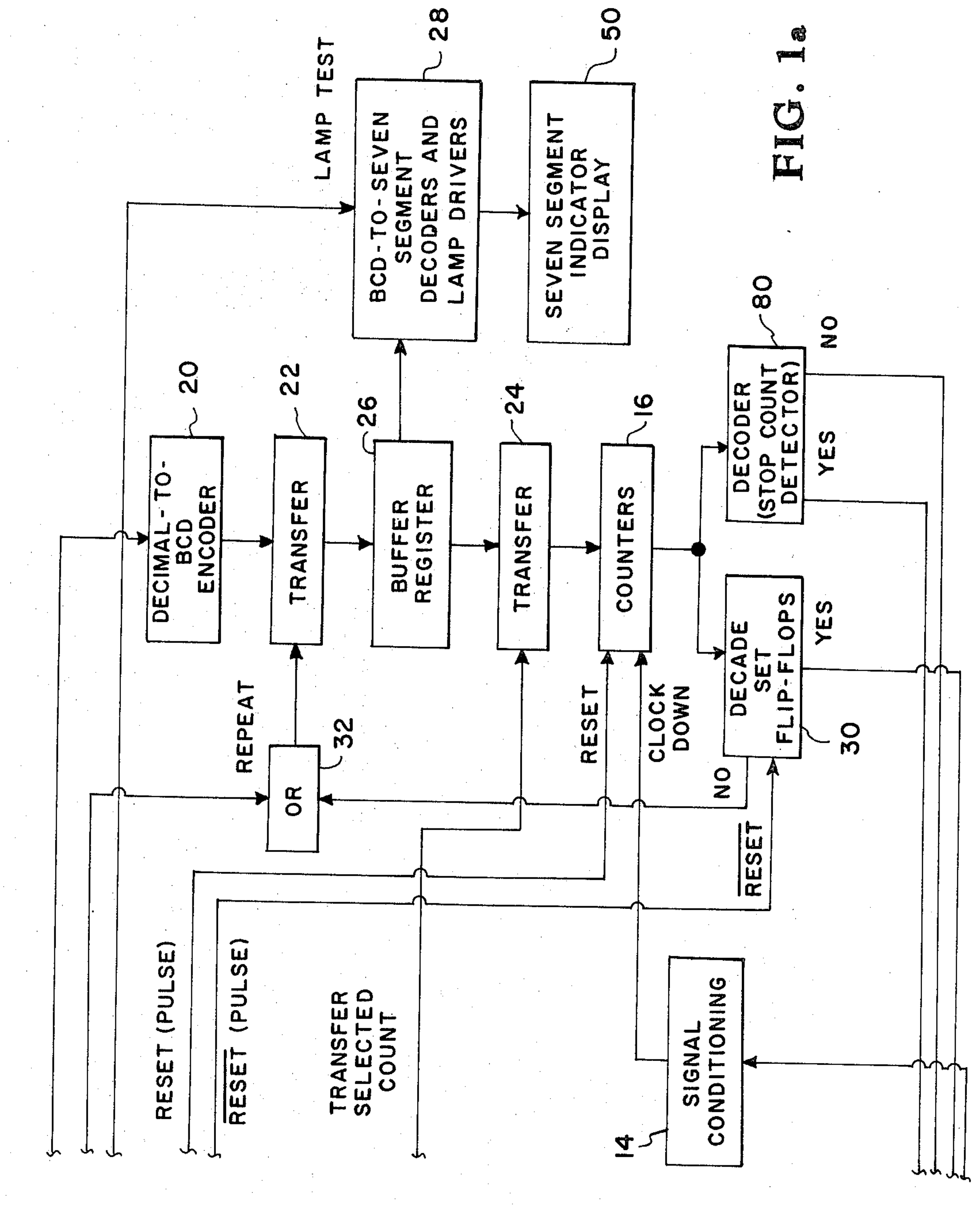

The overall invention in its broadest aspects can best be understood by considering FIG. 1 which is a block diagram of the overall system. However, certain features of the invention may not be readily apparent from FIG. 1, and thus in describing the system of FIG. 1, reference will also be made to FIGS. 2 to 7 which illustrate details of that system.

Before considering the control system itself, it is noted that the invention will be described relative to the control of a folding machine of the type utilizing a vacuum operated feed head and in which the control of machine operation is effected through breaking the vacuum lines at the desired times. This is accomplished through the use of a remotely operated solenoid valve 128 shown schematically in FIG. 1, the valve 128 being vented so that opening thereof eliminates the effects of the vacuum. It will be understood, however, that the details of construction of the folding machine form no part of the invention and that the control system of the invention is suitable for use with folding machines of various constructions.

Figures 2, 7:
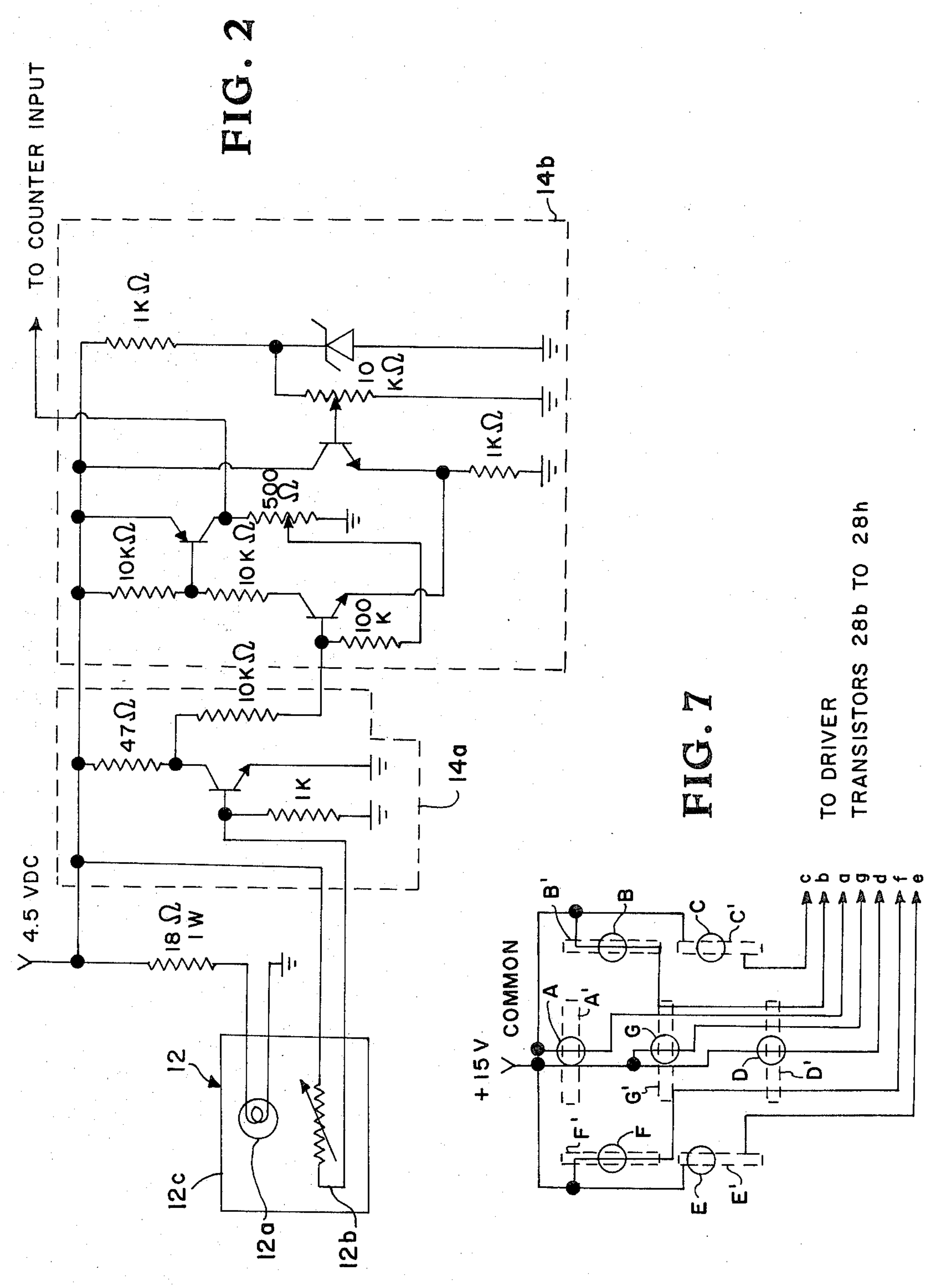
FIG. 2 is a schematic circuit diagram of the sensor and signal conditioning circuits shown in block form of FIG. 1.
FIG. 7 is a schematic diagram of one of the lamp display devices used in displaying the selected numbers.

The system of FIG. 1 includes a paper sensor represented by block 12 which, as illustrated in FIG. 2 includes a sensor lamp or light source **12*a* and light-responsive variable resistor device or photoresistive cell 12*b*. The lamp 12*a* and photoresistive cell 12*b* of sensor 12 are mounted with a single U-shaped bracket indicated schematically at 12*c* on a table which is part of the folding machine. When a printed sheet passes between the light source 12*a* and the photoresistive cell 12*b*, a resultant change in the resistance of the cell 12*b*** will cause a shift in the voltage level in the first stage 14*a* of the two-stage signal conditioning circuit indicated at 14 in FIG. 1. As shown in FIG. 2, the second stage 14*b* comprises a Schmitt trigger which improves the rise time and fall time of the voltage signal at the collector of the transistor in stage 14*a* before application to one input of a counter circuit 16 (see FIG. 1) described in more detail herein below.

A second input to the system is provided by a copy number selector represented by block 18. In accordance with a presently preferred embodiment, selector 18 includes thirty push botton switches (not shown) which allow the operator to enter the desired number of copies to be folded. The push bottons are arranged in three rows of ten, corresponding to ones, tens and hundreds so that any number of copies between two and 999 can be selected. As explained below, because of the placement of sensor 12, a single copy must be obtained by manual operation. Only one button per decade will register in the controller; e.g., if a 2 is selected in a particular decade, the 2 will be stored in an appropriate counter as described below and further pressing of buttons in that decade will have no effect. This feature prevents accidental depressing by bumping or other contact with the machine from changing the number entered into the selector.

Figure 3:
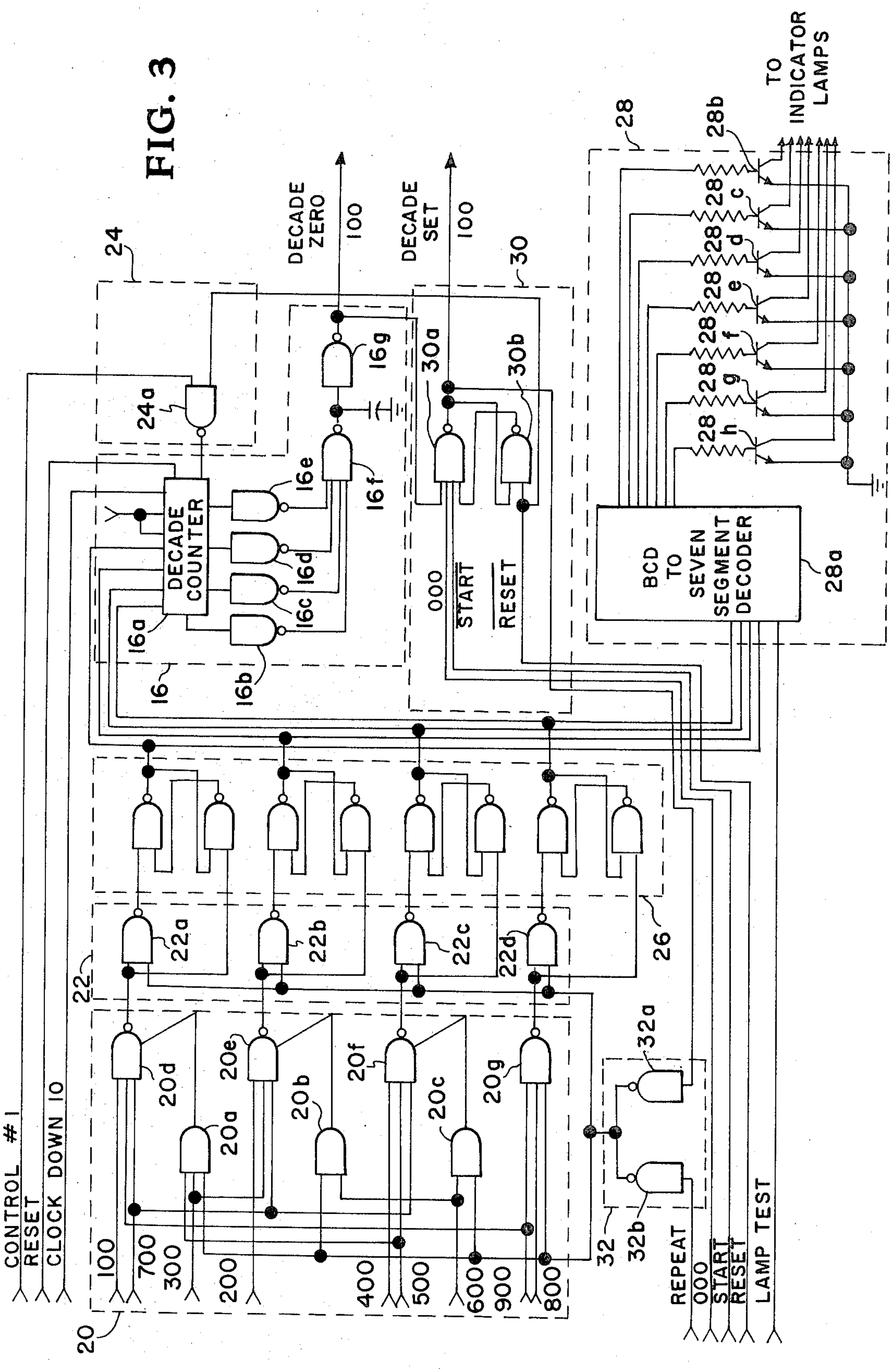
FIGS. 3, 4 and 5 are schematic circuit diagrams of the hundreds, tens and units decade counter stages, respectively.
Figure 4:
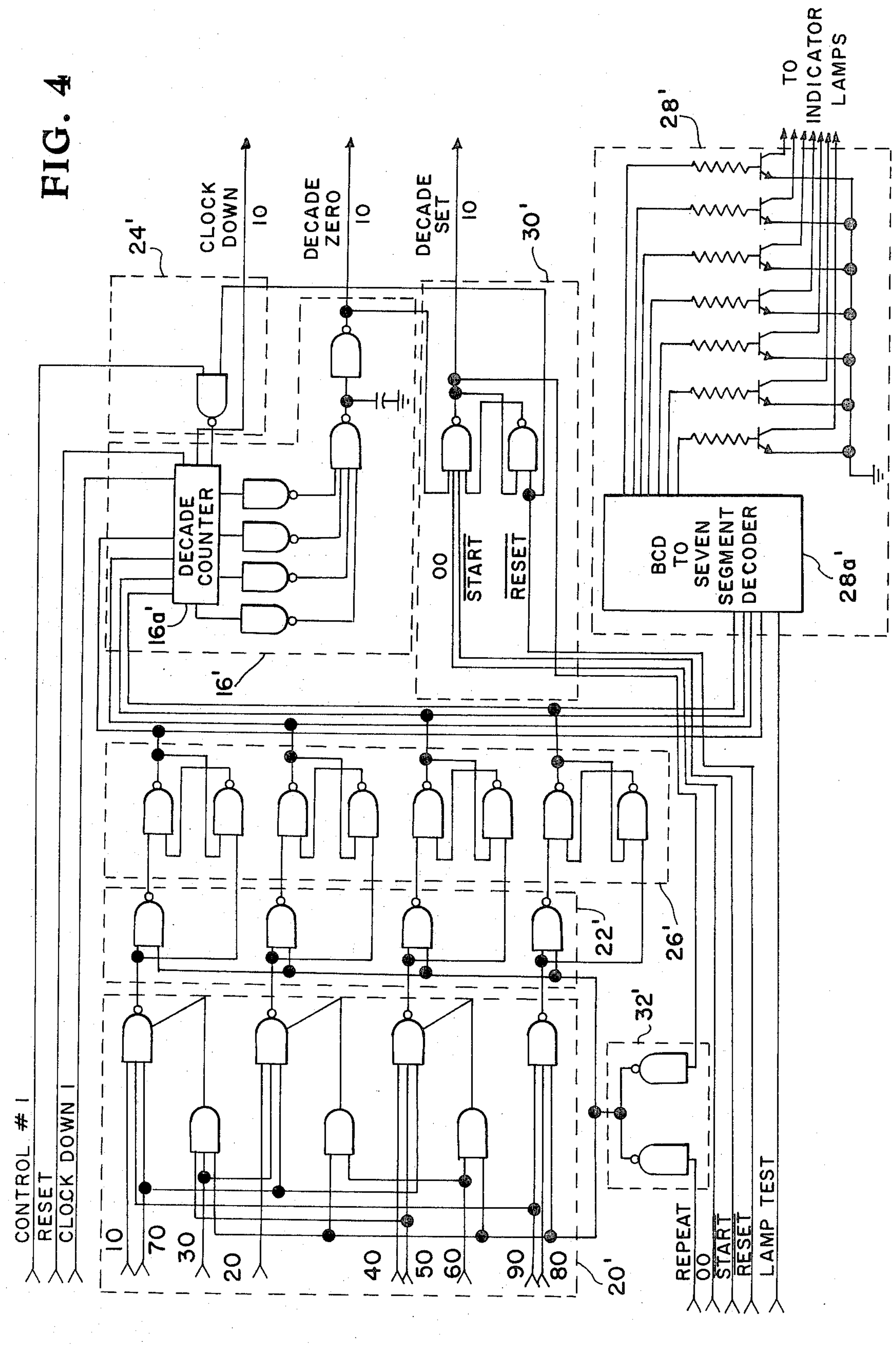
Figure 5:
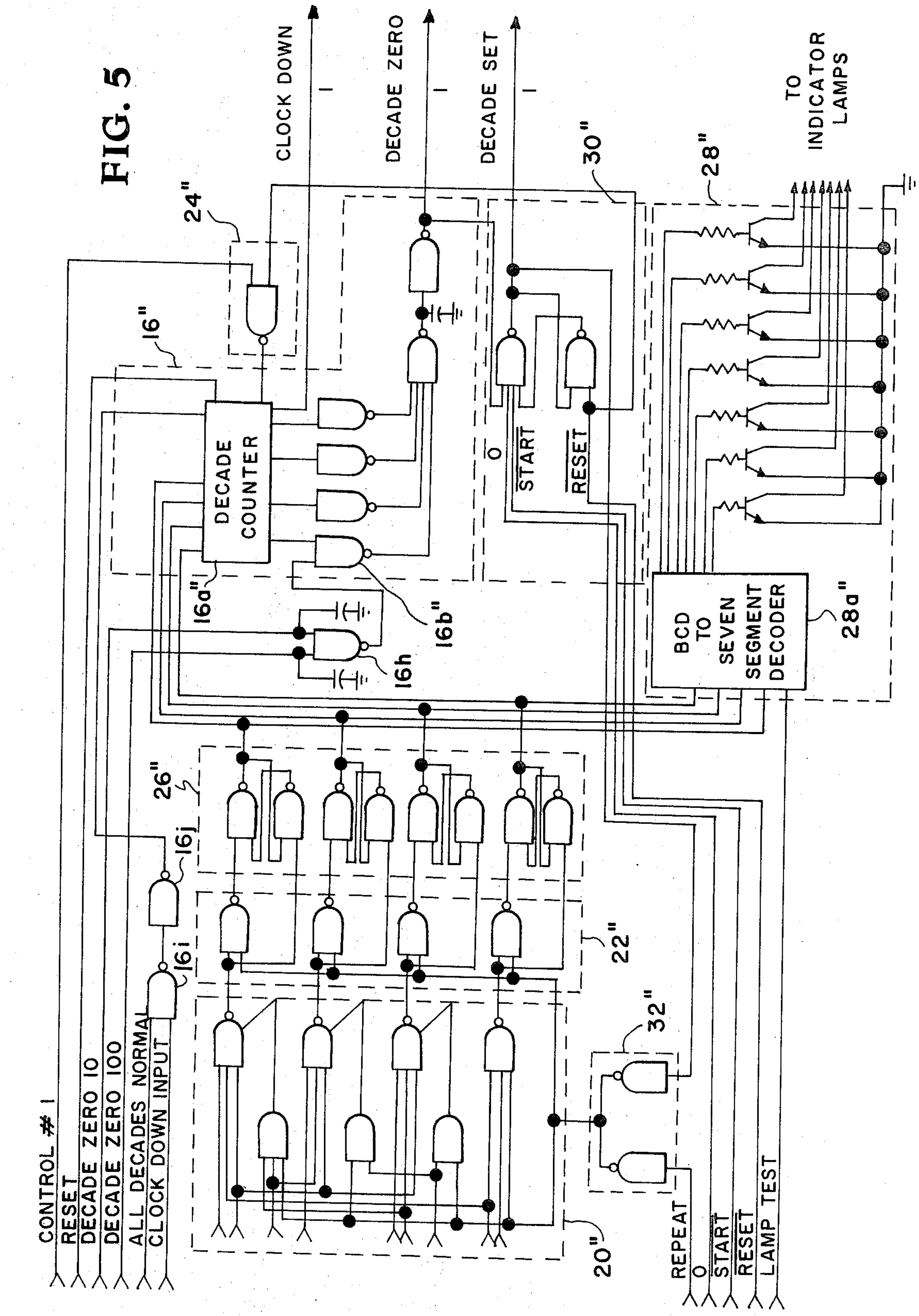

The controller itself includes three nearly identical decade counter stages shown in FIGS. 3, 4 and 5 and corresponding to the three decades of push bottons in selector 18. The duplicated portions of three stages, which are not shown separately in FIG. 1, comprise a decimal to BCD encoder 20, transfer circuits 22 and 24, a buffer register 26 and a BCD-to-seven segment decoder and lamp driver circuit 28, all of which are described in more detail hereinbelow.

The decade counter stages can best be understood by considering the hundreds counter embodiment shown in FIG. 3. The decimal-to-BCD encoder 20, indicated within dashed lines, serves to encode the binary level inputs corresponding to the ON or OFF states from the push button copy selector switches of selector 12 into 8–4–2–1 binary coded decimal (BCD). More specifically, the inputs on the nine decimal lines (100 to 900) from selector 18 are operated on by logic circuitry including NAND gate expanders 20*a*, 20*b* and 20*c* and NAND gates 20*d* to 20*g* so that the outputs at the NAND gates 20*d* to 20*g* represent the same number in BCD as dictated by the push buttons depressed in the selector 18. The output on the tenth decimal line (000) is fed directly to a corresponding decade set flip-flop 30 described below. The four outputs from NAND gates 22*a* to 22*d* together with the outputs provided by direct connections to the outputs of NAND gates 20*d* to 20*g* form the individual inputs to the buffer register 26 which hence receives and stores the BCD output of decimal to-BCD encoder circuit 20. The individual outputs of NAND gates 20*d* to 20*g* are connected to transfer circuit 22, formed by four NAND gates 22*a* to 22*d* which allows transfer of the output of circuit 20 to buffer register 26 under control of an OR gate 32. The outputs of buffer register 26 are connected to the counter circuit 16 mentioned above which comprises an up-down decade counter and to BCD-to-Seven Segment decoder 28*a*. The information stored in buffer register 26 is presented continuously to the decade counter 16*a* and counter 16*a* is used exclusively in the down mode. Transfer of the stored information from register 26 to decade counter 16*a* is controlled by transfer circuit 24 and occurs when the input signals from a "control No. 1" flip-flop 40 described below and a pulsed reset signal from a reset one-shot 126 are both "high", transfer circuit 24 comprising a NAND gate 24*a* as shown. The output of counter circuit 16 is "decade zero" signal which is utilized by the other decade counter stages as described below. The NAND gate 16f acts as a decoder and if a nonzero number is detected, a delayed "decade zero" signal is applied to the decade set flip-flop 30 mentioned above.

As stated, the output of counter circuit 16 is also connected to the decade set flip-flop 30, flip-flop 30 being formed by a pair of NAND gates 30*a* and 30*b* connected as shown. NAND gate 30*a* has four inputs which respectively receive the "decade zero" output of counter 16, the input on the 000 line as mentioned above, a start signal and the output signal from companion NAND gate 30*b*. NAND gate 30*b* has two inputs, one of which is connected to the output of companion NAND gate 30*a* and the other of which is connected to receive the reset signal referred to above. The output of flip-flop 30 is a "decade set" signal which is utilized by the other stages and which is also fed back to encoder 20 to prevent any further information, or noise, from changing the content of the buffer register 26. The output of flip-flop 30 is connected to encoder 20 through the OR gate circuit 32 made up of a first NAND gate 32*a* connected to flip-flop 20 and a second NAND gate 32*b* connected to receive a repeat signal. It should be noted that decade set flip-flop 30 can be set by an input from the 000 decimal line as well as by a start pulse so that it is not necessary to push a button in every decade for proper operation of the controller.

The outputs of buffer register 26 are also connected to BCD-to-seven segment decade and lamp driver circuit 28. Circuit 28 includes a BCD-to-seven segment decoder 28a which has four inputs which are connected to the outputs of the buffer register 26 and one which is connected to receive a "lamp test" signal. Decoder 28*a* has seven outputs which are individually connected to seven lamp drive transistors 28*b* to 28*h*. As indicated in FIG. 7, transistors 28*b* to 28*h* are each connected to an associated lamp A, B, C, D, E, F or G, respectively. The seven lamps A to G are positioned adjacent light transmissive panels or slots A' to G', respectively, and, when energized, will illuminate the adjacent panel. The light transmissive panels A' and G' are arranged to form a squared-off version of the numeral "eight" and by selective energization of groups of the panels the numerals 0 to 9 can be represented. Thus lamps A to G serve to provide a visual indication of the push button which has been depressed in the hundreds column. The lamps A to G and light panels A' to G' are represented by block labeled seven segment indicator display and denoted 50 in FIG. 1.

It is noted that a "clock down" signal is also connected to decade counter 16*a*. The "clock down" signal for the hundreds decade counter 16*a* is derived from the borrow signal of the tens decade counter shown in FIG. 4 which is, in turn, derived from borrow signal of the units decade counter of FIG. 5. The "clock down" signal for the units counter is itself derived from the signal conditioning electronics 14 connected to paper sensor 12 as described above. A further signal of interest is the "repeat" signal which is connected through NAND gate 32*b* of gating circuit 32 to encoder 20 and which prevents the buffer register 26 from resetting when the selected count is reached.

FIGS. 4 and 5 are circuit diagrams of the tens counter stage and units counter stage, respectively. As mentioned above, the tens and units counters are quite similar to the hundreds counter stage discussed hereinabove and circuit elements corresponding to those shown in FIG. 3 have been given the same numbers with primes attached in FIG. 4, and with double primes attached in FIG. 5. Referring to FIG. 4, and comparing the circuit shown therein with that shown in FIG. 3, it will be seen that the inputs are substantially the same with the tens (20, 30, 40 . . . 90) inputs, a "clock down units" input and a 00 input replacing the corresponding hundreds, "clock down, tens" and 000 inputs of FIG. 3. The outputs of the tens counter stage of FIG. 4 are also similar to those of the hundreds counter stage of FIG. 3, with corresponding "decade zero" and "decade set" signals being developed as described above. In addition, the "clock down, tens" signal referred to above is generated at one output of decade counter 16*a'* and which, as described, forms one input to the hundreds counter stage. Otherwise, the two stages are substantially identical and hence the description set forth above of the corresponding elements in FIG. 3 will not be repeated here.

Referring to FIG. 5, the inputs to the units stage shown therein are also quite similar to those described above with units inputs, and a direct 0 input replacing the corresponding inputs in the hundreds and tens counter stages. The units stage receives both "decade zero, tens" and "decade zero, hundreds" inputs which are connected to a further NAND gate 16*h*, the output of which forms one input to NAND gate 16*b''* of counter 16'' as shown. Due to the placement of the sensor 12, the controller is designed so that the folding machine stops when the sensor 12 has detected one less printed sheet than set into the controller. This is necessary because the sensor 12 detects the first sheet after the second sheet has already been started through the folding machine. As a consequence, the units decade counter 16'' is modified so that a 1 would not be accepted as a valid count unless either the tens or hundreds decade is nonzero. Because of this, NAND gate 16*h''*, connected as described, is used.

As mentioned above, the "clock down" signal for the units counter stage is derived from the output of the sensor signal conditioning circuit 14. This output is represented by the "clock down input" signal which together with an "all decades normal" signal forms the inputs of a pair of series connected NAND gates 16*i* and 16*j* connected to the decade counter 16*a''* of counter circuit 16''. By gating the "clock down" signal from sensor signal conditioning circuit 14 with a signal requiring that all decades have the decade set flip-flop "true", inadvertent counting before folding actually starts is prevented. The control outputs, i.e., "clock down", "decade zero", and "decade set", correspond to those of FIG. 4. All the stages also drive indicator or display lamps, as indicated in the drawings and discussed above.

Figure 6:
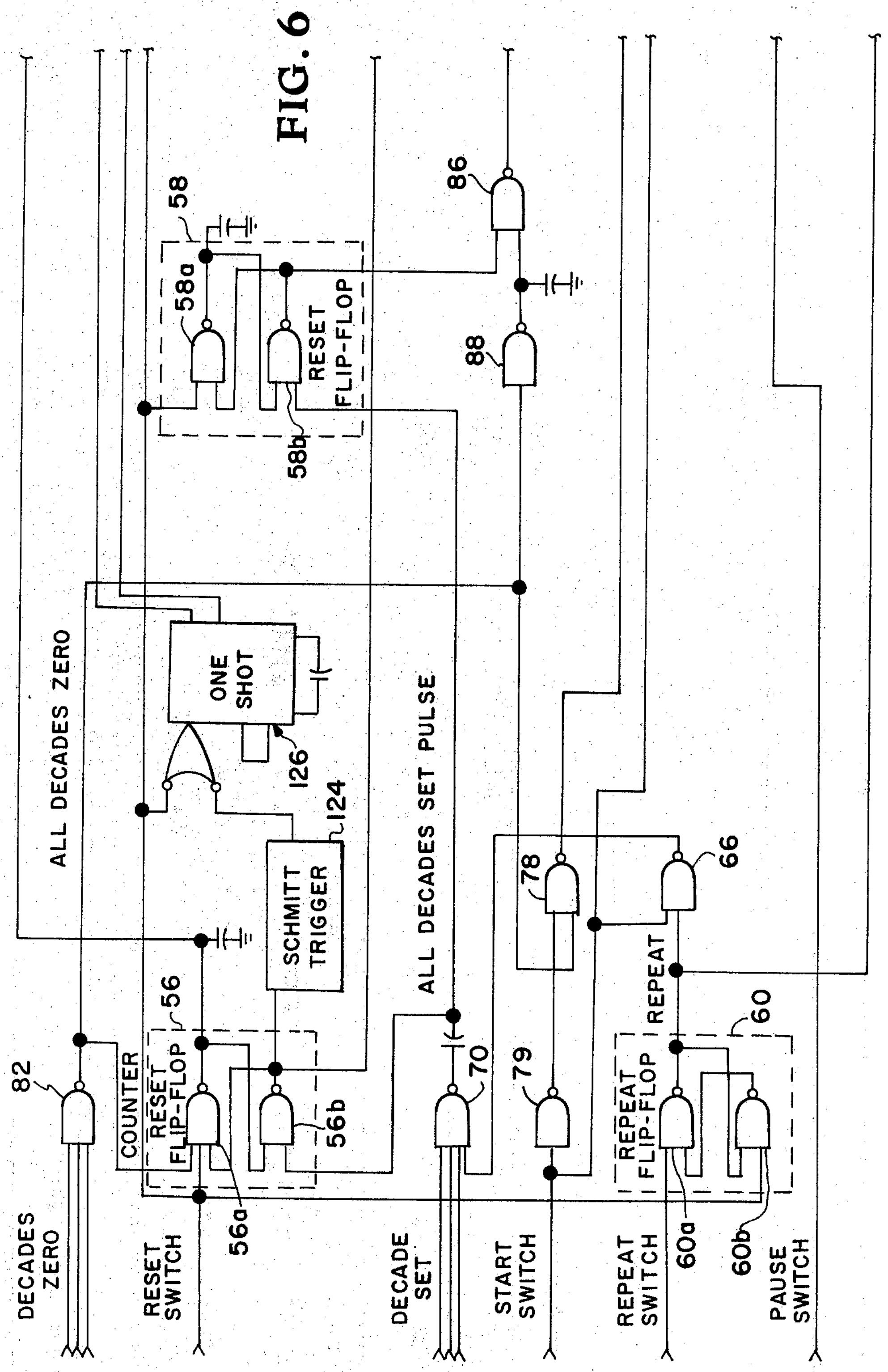
FIG. 6 is a schematic circuit diagram of the logic control circuitry of FIG. 1.
Figure 6A:
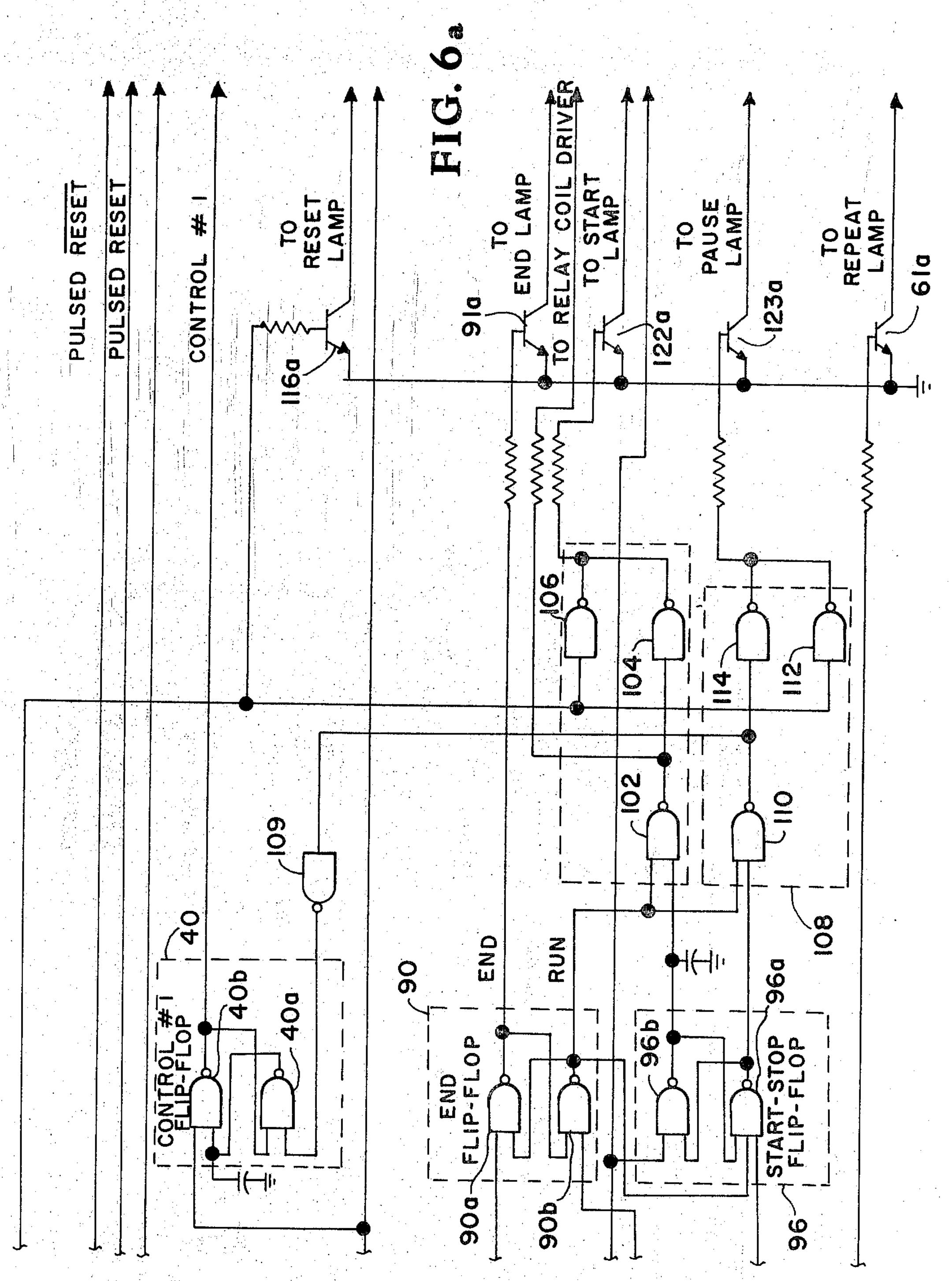

Referring again to FIG. 1, and to FIG. 6, the control inputs and associated logic control circuitry can best be understood from considering these figures together. Before proceeding further, it should be noted that there is not exact one-to-one correspondence between FIGS. 1 and 6. To explain, FIG. 1 might be said to illustrate the "functions" of the elements so as to provide an understanding of the operation of the circuit, and FIG. 6 shows the actual circuitry used in one embodiment. Hence, an AND gate shown in FIG. 1 might be part of another circuit element in the actual circuit shown in FIG. 6, and separate numbers have been given to what are essentially the same elements, in some instances. When this is done, the FIG. 1 number is given first and the FIG. 6 number given in parenthesis.

The inputs to the controller include a reset switch 52 (see FIG. 1) which is connected (1) to the BCD-to-seven segment decoder and lamp drive circuits 28 and forms the "lamp test" input thereto, (2) to an OR gate, denoted 54 in FIG. 1, corresponding to NAND gate 56*a* (see FIG. 6) of a reset counter flip-flop 56 which includes a further NAND gate 56*b* as shown in FIG. 6 and (3) to a reset logic flip-flop 58 formed by NAND gates 58*a* and 58*b* as shown. Reset switch 52 is also connected to one input of a repeat flip-flop 60. Switch 52, similar to the other switches described below, is a lighted push button switch which, when depressed, is illuminated by a corresponding reset lamp 116 referred to hereinbelow.

Repeat flip-flop 60 includes a second input which is connected to a repeat switch 62 (see FIG. 1) and two outputs, the "no" output thereof being connected to an OR gate, denoted 64 in FIG. 1, which corresponds to NAND gate 66 of FIG. 6. The OR gate 64 is connected to an AND gate 68, denoted in FIG. 1, and formed by a NAND gate 70 in FIG. 6. As shown in FIG. 6, a capacitor is connected in series with the output of NAND gate 70. As illustrated, AND gate 68 (NAND gate 70) receives a further decade set input from the decade set flip-flops 30 of FIG. 2 and the second input thereto being connected to OR gate 64. The "yes" output of flip-flop 60 is connected to an AND gate 72 which is also formed by NAND gate 66 of FIG. 6, the output of AND gate 72 being shown in FIG. 1 as being connected to OR gate 64. The "yes" output of flip-flop 60 is also connected to repeat lamp 61 which thus provides an indication when the "yes" output is high, and to OR gate 32 described above in connection with FIG. 3.

Start switch 74 is also connected to an AND gate 76, corresponding to NAND gate 78 in FIG. 6, NAND gate 78 being connected to the "start switch" input through a further NAND gate 79 in FIG. 6. The second input to AND gate 76 is connected to the "no" output of a decoder 80 formed by NAND gate 82 of FIG. 6. The "yes" output of decoder 80 (see FIG. 1) is connected to OR gate 54 (NAND gate 56*a*) described above and to a further AND gate 84 formed by NAND gate 86 in FIG. 6, a further NAND gate 88 (FIG. 6) being connected between the output of NAND gate 82 and the input NAND gate 86. The second input to AND gate 84 (NAND gate 86) is derived from reset flip-flop 58 as shown. Start switch 74 is also connected to an end flip-flop 90, formed as shown in FIG. 6 by NAND gates 90*a* and 90*b*, the other input to flip-flop 90 being the output of AND gate 84 (NAND gate 86). The "end" output of end flip-flop 90 is connected to an end lamp 91 (FIG. 1) and, more particularly, as shown in FIG. 6, to an end lamp drive transistor 91*a*.

A pause switch 92 is connected to an AND gate 94 formed by NAND gate 96*a* which as shown in FIG. 6 is part of a start-stop flip-flop 96 which, also as shown in FIG. 6, includes a second NAND gate 96*b*. The second input to AND gate 94 is formed by the "run" output of "end" flip-flop 90. The inputs to start-stop flip-flop 98 are the output of AND gate 94 (NAND gate 96*a*) and the output of AND gate 76 (NAND gate 78) described above. The "start" output of start-stop flip-flop 98 is connected to one input of a first AND gate 100, formed by three NAND gates 102, 104, and 106 in FIG. 6, whereas the "stop" output of start-stop flip-flop 98 is connected to a second gate 108 formed by three further NAND gates 110, 112, and 114 in FIG. 6. One further input of each of the AND gates 100 and 108 is connected to the "no" output of reset counters flip-flop 56. This connection is shown schematically in FIG. 6 as the "yes" output of flip-flop 56 (output of NAND gate 56a) being the only input to NAND gates 106 and 112. Due to the parallel output connections of NAND gates 104 and 106 and NAND gates 112 and 114 (internal to the AND gates 100 and 108 of FIG. 1 respectively), the NAND gates 106 and 112 effectively negate the "yes" input from flip-flop 56 and hence shown in FIG. 1 as coming from the "no" output. The "yes" output from reset flip-flop 56 is connected to the reset lamp 116 referred to above (see FIG. 1) indicated by lamp driver transistor 116a in FIG. 6. The third input to each of the AND gates 100 and 108 is connected to the "run" output of end flip-flop 90.

The output of AND gate 100 is connected to an AC switch 118 (see FIG. 1), to a "start" lamp 122 (FIG. 1), and to the control No. 1 flip-flop 40 mentioned above whereas AND gate 108 is connected to a "pause" lamp 123 (FIG. 1). In FIG. 6, NAND gates 104, 106 and 112, 114 are shown connected to a start lamp drive transistor 122*a* and a pause lamp drive transistor 123*a*. Repeat lamp drive transistor 61a is also shown in FIG. 6. Further, as shown in FIG. 6, the output of AND gate 100 is actually taken from the output of NAND gate 110 and is connected to the input of flip-flop 40 through a further NAND gate 109 which provides the necessary logical conditioning.

As shown in FIG. 6, control No. 1 flip-flop 40 includes a pair of NAND gates 40*a* and 40*b* and, referring to FIG. 1, the second input to control No. 1 flip-flop 40 is provided by the "yes" output of "reset counters" flip-flop 56 referred to above. The abovementioned "yes" output of flip-flop 56 is also connected to a Schmitt trigger 124, the output of which forms one input to a monostable multivibrator or one shot 126. The second input to one shot 126 is connected to reset switch 52, the two outputs of one shot 126 respectively producing the "reset" and "$\overline{\text{reset}}$" pulses referred to above.

The AC switch 118 referred to above may comprise a simple transistor switch or driver (not shown) which, when conducting, causes deenergization of a relay (not shown) and closing of the normally open relay contacts (not shown). As shown in FIG. 1, the output of AC switch 118 is connected to a solenoid control valve 128 which, in an exemplary embodiment can comprise a normally closed valve, No. 8210098, manufactured by the Automatic Switch Company.

The operation of the control logic shown in FIGS. 1 and 6 can perhaps be best understood by following the operation procedure of the controller. The operation will be explained with reference to FIG. 1 with references being made to the other figures and, in particular, to FIG. 6, where appropriate. Because of the use of the normally closed solenoid valve 128 in the vacuum line, normal manual operation of the folding is possible with no power applied to the controller. Because of this, solenoid valve 128 is deenergized to start the folding process.

The operation is begun by depressing and releasing the reset switch 52 which produces the "lamp test" signals referred to above and causes such a signal to be applied to the BCD-to-seven segment decoder and drive circuits 28 (FIG. 3), 28' (FIG. 4), and 28'' (FIG. 5) for the three stages, which circuits are collectively indicated at 28 in FIG. 1, as explained above. This provides a quick check of all of the lamps 50. The reset counter flip-flop 56 is reset with NAND gates 56*a* "high" (see FIG. 6) and the reset output drives the base of reset lamp transistor 116*a* (see FIG. 6) to provide lighting of lamp 116. This output is also connected to AND gate 100 and 108 where it is inverted by NAND gates 106 and 112 and used to prevent either of the "pause" and "start" lamps 124 and 122 from being energized at the same time as the reset lamp 116. In this state, reset counter flip-flop 56 also triggers one shot 126 through Schmitt trigger 124 so that the "pulse reset" and "pulse $\overline{\text{reset}}$" signals referred to above are generated. This "pulse $\overline{\text{reset}}$" signal is transmitted to the decade set flip-flops 30 to provide resetting thereof so that information can be stored in buffer registers 26, one output of each of the flip-flops 30 being connected back to the corresponding buffer register 26 as discussed above. The "pulse reset" signal is transmitted to the decade counters 16 to provide "initializing" of the counters 16. Finally, reset counters flip-flop 56 causes resetting of repeat flip-flop 60, if flip-flop 60 was not previously in this state, and setting of control No. 1 flip-flop 49 so as to allow information to be transferred to the decade counters 16, flip-flop 40, as described above, being connected to transfer circuits 24 which control transfer of data to counters 16.

At this time, the number of copies to be folded is entered by depressing the appropriate push buttons in each decade of copy selector 18. As described in some detail hereinabove, depressing of the push buttons in selector 18 causes entry of the appropriate coded counter control information into counters 16 as well as energization of the corresponding seven segment display lamps 50 to indicate which push buttons have been depressed. Each decade shown in FIGS. 3, 4 and 5 produces two signals which are transmitted to the control logic; namely, the "decade set" and "decade zero" signals referred to above. When the information is set in each decade, and hence the decade signals from the stages are all "high", a pulse is produced by AND gate 68 (NAND gate 70) which causes reset counters flip-flop 56 to change state so that NAND gate 56*b* (see FIG. 6) is high. Reset lamp 116 is consequently turned off and pause lamp 124 is turned on through AND gate 108.

Next, the start switch 74 is depressed thereby causing end flip-flop 90 to reset so that the "run" signal is high and hence, the normally energized end lamp 91 connected to the "end" output is turned off. If the "decade zero" outputs of any of the stages is "false", indicating that one of the decades is nonzero, AND gate 80 (NAND gate 82) is high and a start pulse is generated by AND gate 76 (NAND gate 78), the "start" signal from switch 74 and the "no" output of AND gate 80 forming the inputs to AND gate 76 as described above. The pulse produced by AND gate 76 sets the start-stop flip-flop 98 so that the "start" output is "high" thereby causing actuation of AC switch 118 and consequent deenergization of the relay coil for valve 128 and lighting of "start" lamp 122, through AND gate 100. In addition, this pulse is also used in the resetting of control No. 1 flip-flop 40 and thus preventing further information from being entered into the decade counters 16. As explained above, with the relay coil thereof deenergized, valve 128 is actuated and hence the folding machine is now in operation.

During the operation of the machine, depressing of pause switch 92 will cause resetting of the start-stop flip-flop 98 through AND gate 94 (NAND gate 96*a*) so that the "stop" output is high. Under these circumstances, a signal is coupled to AND gate 108 causing the pause lamp 124 to be turned on and solenoid control valve 128 to be energized so that the folding machine stops. The folding machine can be restarted by depressing start switch 74 again, with the results outlined above.

The next occurrence which takes place during normal operation is that the present count is reached and the counts in all of the decades become zero so that the "decade zero" lines are low. Under these conditions, the "yes" output of decoder 80 (NAND gate 82) is coupled to OR gate 54 (NAND gate 56a) so that reset counters flip-flop 56 is set and one-shot 126 produces delayed "pulsed reset" and "pulsed $\overline{\text{reset}}$" signals. At the same time, the fact that the "no" output of reset counters flip-flop 56 is low causes setting of control No. 1 flip-flop 40 so that information can again be entered into the decade counters 16, the buffer registers 26 being cleared to zero. In addition, the "yes" output of decoder 80 (the "all decoders zero" signal of FIG. 6) is inverted by NAND gate 88 (see FIG. 6) and, together with "no" output of reset logic flip-flop 58, is applied to AND gate 84 (NAND gate 86). The resultant pulse from gate 84 causes setting of end flip-flop 90 and consequent energization of end lamp 91. With the "run" output of flip-flop 90 low, AC switch 118 is deactuated and because of the corresponding actuation of solenoid valve 128, the folding machine is thus stopped.

For "repeat" operation, information is entered into the decade stages from the copy number selector 18 as described before. The repeat switch 62, when actuated, causes setting of the repeat flip-flop 60 and turns on the repeat lamp 61. The output of repeat flip-flop 60 is connected to transfer circuit 24 through AND gate 72, OR gate 64, AND gate 68, reset counters flip-flop 56 and control No. 1 flip-flop 40 and prevents the buffer registers 26 from clearing when the desired count is reached. In this manner, the same information as before is entered into the decade counters 16 when the folding machine has folded the selected number of copies. No reset pusles are generated when the previous information is again entered on to the decade counters 16. However, depressing the start switch 74 under these circumstances, i.e., when the "yes" output of the repeat flip-flop 60 is high, will result in the generation of reset pulses because of the connection between repeat flip-flop 60 and reset counters flip-flop 56. The controller hence operates as described previously. Hence, to fold multiple groups of the same number of sheets, the selected number within the group is entered into copy selector 18 and the repeat switch 62 is depressed. The start switch 74 is then depressed and the folding machine will be shut off when the selected number of sheets has been folded. By simply depressing the start switch 74 again, the operation will be repeated and the same number of copies will be folded. To return to single group operation or to change the number of copies to be folded, the reset switch 52 is depressed. As discussed above, the operation can be halted at any time by depressing the pause switch 92, in addition to the reset switch. However, depressing the pause switch 92 will not alter the number of copies selected or the number of copies actually counted. Hence, if the folding machine is stopped using the pause switch 92 to, for example, clear a paper jam, the number of copies actually folded will not agree with the number set into the counters 16 since the sensor 12 detects the sheets before they are folded.

It should be pointed out that the detailed circuit diagrams shown in FIGS. 2, 3, 4, 5 and 6 are set forth for purposes of completeness and that the system of FIG. 1 can, of course, be implemented by different and more refined circuitry. Further, it will be understood by those skilled in the art that other variations and modifications can be effected in the exemplary embodiment disclosed without departing from the scope and spirit of the invention.

I claim:

1. A digital controller for automatically controlling the operation of a folding machine comprising selector means for producing a decimal number output representing a desired number of sheets to be folded as selected by an operator; encoding means connected to said selector means for converting the output of said selector means into an output comprising a corresponding number coded according to a selected digital code; buffer register means for storing the coded output of said encoder means; sensor means for detecting the passage of the sheets to be folded to the folding machine and for producing an output signal each time one of said sheets passes to the folding machine; counter means responsive to said coded output stored in said buffer register means and connected to said sensor means for counting down, from said stored coded output, said output signal from said sensor means; means connected to said counter means for producing an output control signal when the counter means counts down to zero; transfer means for controlling the transfer of the coded number stored in said buffer register means to said counter means; and folding machine control means connected to receive said output control signal for controlling stopping of the operation of the folding machine in response to the production of said output control signal.

2. A digital controller as claimed in claim 1 further comprising repeat control means for controlling the operation of the folding machine so that the same number of sheets are folded without the necessity of reentering the number into said selector means.

3. A digital controller as claimed in claim 2 further comprising reset means for resetting the counter means to initial conditions when the selected number of sheets are folded, said repeat control means comprising means for disabling said reset means.

4. A digital controller as claimed in claim 3 wherein said reset means includes decoder means connected to said counter means for producing an output responsive to the counter means stopping counting, a bistable multivibrator having first and second outputs for producing an output signal at said first output responsive to the production of said output by said decoder means, and monostable multivibrator means connected to said counter means for resetting said counter means responsive to the production of a said output signal at said first output by said bistable multivibrator means.

5. A digital controller as claimed in claim 4 further comprising a reset switch, and an OR gate having an output connected to bistable multivibrator means, a first input connected to said reset switch and a second input connected to said decoder means, said controller further comprising further bistable multivibrator means having a first input connected to the second output of the first-mentioned bistable multivibrator means and an output connected to said transfer means for controlling transfer of stored information from the buffer register means to said counter means.

6. A digital controller as claimed in claim 1 further comprising a pause switch and means for connecting said pause switch to the folding machine control means so as to cause termination of the operation of the machine when said pause switch is actuated.

7. A digital controller as claimed in claim 6 further comprising a start switch for controlling starting of the operation of the folding machine, a start control bistable multivibrator means for, when set, actuating said machine control means to cause starting of the operation of the folding machine, multivibrator set control means responsive to entry of a nonzero number into said counter means for controlling setting of said start multivibrator means, and an AND gate having an output connected to said start multivibrator means, a first input connected to said multivibrator set control means, and a second input connected to said start switch.

8. A digital controller as claimed in claim 6 further comprising an end control bistable multivibrator means having a first input connected to said start switch, and an AND gate having one input connected to a first output of said end control multivibrator means, a second input connected to said pquse switch and an output connected to a second reset pause of said start control multivibrator means.

9. A digital controller as claimed in claim 1 wherein said selector means comprises at least three decades of selectors respectively representing units, tens, and hundreds, said encoding means including first, second and third encoders respectively responsive to the units, tens, and hundreds selectors, said buffer register means including first, second and third buffer registers respectively connected to said first, second and third encoders and said counter means comprising first, second and third counters respectively connected to said first, second and third buffer registers, said folding machine control means comprising stop-count detector means for detecting the termination of counting by all of said counters.

10. A digital controller as claimed in claim 9 further comprising means for displaying the decimal number entered into said selector means including three sets of visual display lamps individual to each decade, each set of lamps being arranged in a predetermined pattern so that by selective energization of groups of the lamps the selected decimal numbers can be represented, and means connected to said buffer register means for converting the coded number stored in said buffer register means into a drive signal for the group of lamps which represent the corresponding decimal number.

11. A controller as claimed in claim 10 wherein said counter means includes a counter means for detecting the output of the counter, said controller further comprising a decade set bistable multivibrator for producing a signal which prevents entry of further information into the buffer register means responsive to a predetermined output of said detecting means, and reset means for causing resetting of the counter and resetting of said bistable multivibrator responsive to the production of a said output control signal.

12. A controller as claimed in claim 10 wherein said encoder means comprises a decimal to binary coded decimal encoder and said converting means comprises a binary coded decimal to seven segment decoder.

* * * * *